(12) United States Patent
Andrus

(10) Patent No.: US 10,063,273 B2
(45) Date of Patent: Aug. 28, 2018

(54) ELECTRONIC DEVICE HOLDER

(71) Applicant: HeartWare, Inc., Miami Lakes, FL (US)

(72) Inventor: Lance Lynn Andrus, Southborough, MA (US)

(73) Assignee: HeartWare, Inc., Miami Lakes, FL (US)

( * ) Notice: Subject to any disclaimer, the term of this patent is extended or adjusted under 35 U.S.C. 154(b) by 0 days.

(21) Appl. No.: 15/616,673

(22) Filed: Jun. 7, 2017

(65) Prior Publication Data

US 2017/0272114 A1  Sep. 21, 2017

Related U.S. Application Data

(63) Continuation of application No. 15/163,810, filed on May 25, 2016, now Pat. No. 9,698,851.

(60) Provisional application No. 62/166,930, filed on May 27, 2015.

(51) Int. Cl.
| | |
|---|---|
| *H04M 1/00* | (2006.01) |
| *H04B 1/3888* | (2015.01) |
| *B60R 11/02* | (2006.01) |
| *G06F 1/16* | (2006.01) |
| *H04M 1/725* | (2006.01) |
| *A45F 5/00* | (2006.01) |
| *H04M 1/04* | (2006.01) |
| *H04M 1/02* | (2006.01) |

(52) U.S. Cl.
CPC ............ *H04B 1/3888* (2013.01); *A45F 5/00* (2013.01); *B60R 11/0241* (2013.01); *G06F 1/1632* (2013.01); *H04M 1/04* (2013.01); *H04M 1/72575* (2013.01); *A45F 2200/0516* (2013.01); *H04M 1/0262* (2013.01)

(58) Field of Classification Search
CPC .... H04M 1/04; H04M 1/0262; H04M 1/6008; H04M 1/6041; H04M 1/6016; H04B 1/3883; H04B 1/3888; B60R 11/0241
See application file for complete search history.

(56) References Cited

U.S. PATENT DOCUMENTS

| | | |
|---|---|---|
| 5,678,204 A | 10/1997 | Naylor |
| 5,697,071 A | 12/1997 | Fan |
| 5,825,874 A | 10/1998 | Humphreys et al. |
| 6,028,930 A | 2/2000 | Chen |
| 6,341,218 B1 | 1/2002 | Poplawsky et al. |

(Continued)

FOREIGN PATENT DOCUMENTS

| | | |
|---|---|---|
| EP | 2227035 A2 | 9/2010 |
| WO | 2014145990 A1 | 9/2014 |

OTHER PUBLICATIONS

International Search Report for Application No. PCT/US2016/034081 dated Aug. 10, 2016.

(Continued)

*Primary Examiner* — Duc M Nguyen
(74) *Attorney, Agent, or Firm* — Christopher & Weisberg, P.A.

(57) ABSTRACT

A holder for a housing of an electronic device includes an extruded metal portion adapted to receive the housing and a securement element that is either mounted to the extruded metal portion or integral with the extruded metal portion. The securement element is adapted to secure the housing in the extruded metal portion.

20 Claims, 3 Drawing Sheets

(56) References Cited

U.S. PATENT DOCUMENTS

| | | |
|---|---|---|
| 6,648,139 B2 | 11/2003 | Fisher, Jr. et al. |
| 7,337,899 B2 | 3/2008 | Sterns |
| 7,894,185 B2 | 2/2011 | Weber et al. |
| 8,023,261 B2 | 9/2011 | Sanford et al. |
| 8,150,484 B2 | 4/2012 | Laurent et al. |
| 8,264,820 B2 | 9/2012 | Zadesky et al. |
| D669,890 S | 10/2012 | Hopkins et al. |
| 8,717,751 B2 | 5/2014 | Marker |
| 8,933,347 B2 | 1/2015 | Kiple et al. |
| 9,078,498 B2 | 1/2015 | Richardson et al. |
| 9,004,434 B2 | 4/2015 | Kang et al. |
| 2002/0190176 A1 | 12/2002 | Louh |
| 2003/0103624 A1* | 6/2003 | Hu .............. A45F 5/02 379/455 |
| 2003/0162510 A1 | 8/2003 | Kim |
| 2004/0188290 A1* | 9/2004 | Sterns ............ A61J 1/03 206/320 |
| 2005/0189913 A1* | 9/2005 | Vitanov ........... H02J 7/0044 320/114 |
| 2006/0058073 A1 | 3/2006 | Kim |
| 2006/0239444 A1 | 10/2006 | Piekarz |
| 2007/0099681 A1 | 5/2007 | Kielland |
| 2009/0270143 A1 | 10/2009 | Bury |
| 2010/0053853 A1 | 3/2010 | Allore et al. |
| 2010/0053911 A1 | 3/2010 | Weiss et al. |
| 2010/0056231 A1 | 3/2010 | Weiss et al. |
| 2010/0124040 A1 | 5/2010 | Diebel et al. |
| 2010/0315041 A1 | 12/2010 | Tan |
| 2011/0073608 A1* | 3/2011 | Richardson .......... A45C 11/00 220/737 |
| 2011/0170725 A1 | 7/2011 | Liu |
| 2013/0231049 A1 | 9/2013 | Sharma et al. |
| 2013/0292296 A1* | 11/2013 | Kang .............. H04M 1/04 206/775 |
| 2014/0009900 A1* | 1/2014 | Yeo .............. H04B 1/3888 361/809 |
| 2014/0138265 A1 | 5/2014 | Bong et al. |
| 2014/0313657 A1* | 10/2014 | Kumar ............ G06F 1/1632 361/679.11 |
| 2015/0241931 A1* | 8/2015 | Carnevali .......... G06F 1/181 361/679.41 |
| 2015/0358439 A1* | 12/2015 | Carnevali ......... H04M 1/0254 455/575.8 |
| 2016/0183393 A1* | 6/2016 | Groom ............ A45C 11/00 280/33.992 |

OTHER PUBLICATIONS

"China Supplier Screwless Alumium Bumper Aluminum Extrusion Case for Iphone 6 4.7" [online] [retrieved Feb. 16, 2015]. Retrieved from the Internet: <URL:http://uk.alibaba.com/product/60057262716-china-supplier-Screwless-Alumium-Bumper-aluminum.htmp>, 8 pages".

* cited by examiner

ELECTRONIC DEVICE HOLDER

CROSS-REFERENCE TO RELATED APPLICATION

This application is a continuation of patent application Ser. No. 15/163,810, filed May 25, 2016, entitled ELECTRONIC DEVICE HOLDER, and claims the benefit of U.S. Provisional Application No. 62/166,930, filed May 27, 2015 the entirety of which is incorporated herein by reference.

STATEMENT REGARDING FEDERALLY SPONSORED RESEARCH OR DEVELOPMENT n/a

TECHNICAL FIELD

The present invention relates to electronic device holders.

BACKGROUND

There is increasing demand for portable computing devices, such as a smartphone, adapted to perform a wide array of functions. The technological sophistication of these devices has increased to meet this demand, such that many portable computing devices are effectively mobile computers completed with an integral display. Because of their mobility and sophistication, said devices are particularly susceptible to damage. A number of cases have been developed to protect such devices from fall damage, water exposure, or like hazards.

Many aspects of modern life have become dependent upon the use of portable computing or smartphone devices. For example, in addition to voice communication, many people have come to rely upon their smartphone for basic functions, such as e-mail and navigation. Numerous software applications have also been developed to monitor or diagnose certain health conditions using the basic functions of said devices, such as a camera and a microphone. Although useful, the specialized capabilities of many such applications are inherently limited by the capabilities of the smartphone itself.

SUMMARY

In one aspect of the present disclosure, a holder for a housing of an electronic device includes an extruded metal portion adapted to receive the housing and a securement element that is either mounted to the extruded metal portion or integral with the extruded metal portion. The securement element is adapted to secure the housing in the extruded metal portion.

Additionally, the extruded metal portion may be made of aluminum. Also, the extruded metal portion may be anodized. The extruded metal portion may include an interior space adapted to receive the housing. Also, the extruded metal portion may include a first sidewall, a second sidewall, and a back portion. Each of the first and second sidewalls may project in a forward direction from the back portion so as to define the interior space. Each sidewall may have an edge portion projecting toward the opposite sidewall. Each edge portion may be remote from the back portion, and the securement element may include each edge element.

The securement element may include a resilient material on an interior surface of the extruded metal portion that is compressed when the housing is received in the interior portion. Also, the resilient material may be adapted to exert a biasing force that secures the housing in the extruded metal portion. The resilient material may be a flocked fabric. An exterior surface of the resilient material may be frictionally engageable with an exterior surface of the housing.

The holder may be adapted to hold the housing of an electronic device adapted to transmit or receive a signal. The extruded metal portion may also have at least one opening adapted to permit passage of the signal when the housing is secured in the extruded metal portion. The holder may be adapted to hold the housing of a cellular telephone and the signal may be a cellular telephone signal.

The holder may also include an electrical component attached to the extruded metal portion. The electrical component may be adapted to interact with the electronic device when the housing of the electronic device is received in the holder. The electrical component may be a power source. The electrical component may also be adapted to transmit or receive a signal. The extruded metal portion may have an open end and the securement element may comprise an endcap mounted to the open end.

The holder may further include an electrical component mounted to the endcap. The electrical component may be adapted to interact with the electronic device when the housing of the electronic device is received in the holder. The electrical component may be a power source. Also, the electrical component may be adapted to transmit or receive a signal. The extruded metal portion may have at least one hole extending therethrough and the securement element may comprise a fixation article inserted into each hole to secure the housing in the extruded metal portion. The fixation article may be a plug or screw.

BRIEF DESCRIPTION OF THE DRAWINGS

The features, aspects, and advantages of the present invention will become better understood with regard to the following description, appended claims, and accompanying drawings in which:

DETAILED DESCRIPTION

Figure 1:
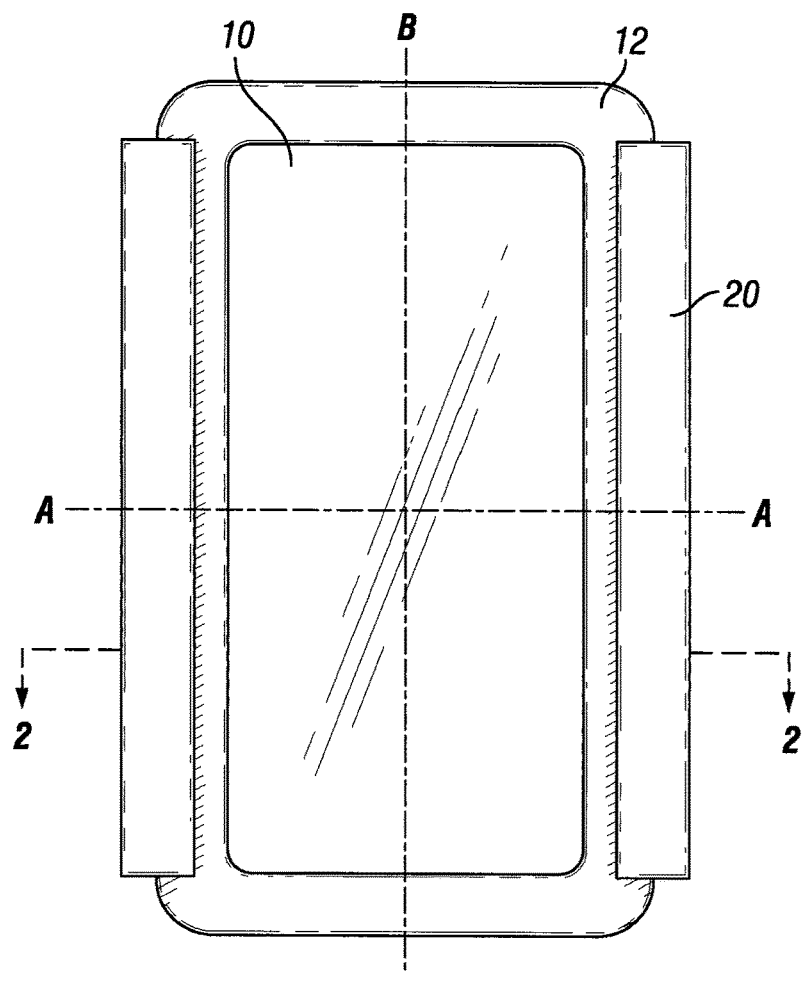
FIG. 1 is a front view of an electronic device holder according to one embodiment of the present disclosure in conjunction with an electronic device.

The present invention is described below a with reference to specific embodiments of an electronic device holder. Some embodiments of the holder are described in relation to an exemplary electronic device, such as smartphone. Nonetheless, the concepts underlying each embodiment could be utilized for any type of device, including any exemplary device described herein.

One embodiment of the present invention is a holder for an electronic device. Holder 20 of FIG. 1, for example, has a body 22 that is adapted receive the exterior housing 12 of an electronic device 10. In some embodiments, device 10 is described as a smartphone with an exterior housing. For example, device 10 may be any one of an Apple® iPhone®, Samsung® Galaxy®, or like device with an exterior housing 12 and an integral screen 16. Other, more specialized devices may also be secured in holder 20, such as an external controller used to operate an implanted medical device.

Body 22 is preferably formed by an extrusion process. For example, body 22 may be formed by advancing a base material along a longitudinal or body axis B-B through a die (not shown) to form a holder 20 with a desired cross-sectional shape, such as cross-sectional shape 21 of FIG. 2. Extruding body 22 ensures that cross-sectional shape 21 will remain substantially uniform along body axis B-B. This uniformity allows holder 20 to be economically produced.

Figure 2:
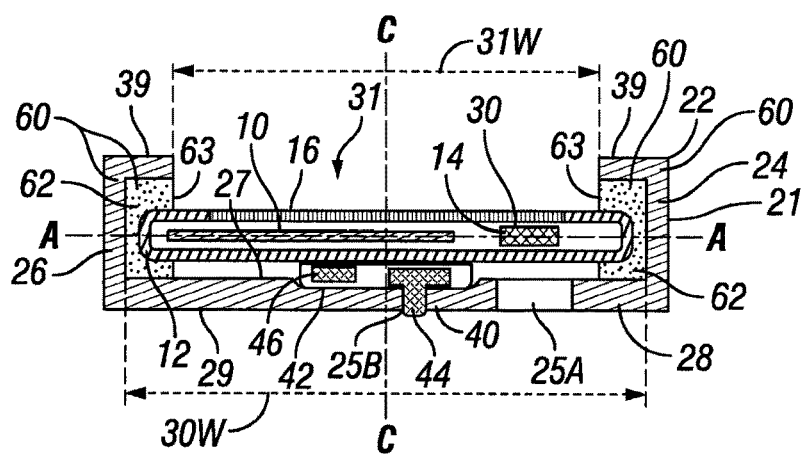
FIG. 2 is a sectional view taken along line 2-2 of FIG. 1.

Each element of body 22 may be described with reference to the cross-sectional view of holder 20 provided by FIG. 2. As shown, for example, cross-sectional shape 21 of body 22 extends along body axis B-B to define a first sidewall 24, a second sidewall 26, and a back portion 28. Back portion 28 has a front surface 27 and a back surface 29. The first and second sidewalls 24 and 26 of body 22 are separated along a body width axis A-A. Each sidewall 24, 26 projects away from the front surface 27 of back portion 28 along a body height axis C-C. In FIGS. 1-2, each of sidewalls 24 and 26 has an edge portion 39 extending therefrom along body width axis A-A. As noted below, each edge portion 39 forms a part of securement element 60 that is positioned opposite of and remote from back portion 28.

The above configuration forms a holding space 30 between the interior surfaces of body 22, and a device opening 31 between the respective edge portions 39 of sidewalls 24 and 26. In FIG. 2, holding space 30 has a holding space width 30W along body width axis A-A that is approximate to a corresponding width of device 10. Space 30 of FIG. 2 also has a holding space height 30H along a body height axis C-C that is approximate to a corresponding height of device 10. Device opening 31 of FIG. 2 also has an opening width 31W along axis A-A. The width of device 10 is preferably less than holding space width 30W, yet greater than opening width 31W. This configuration desirably places device opening 31 in communication with holding space 30 so that the integral screen 16 of device 10, for example, is operable when device 10 is secured in holder 20.

One or more secondary openings 25 may extend through a portion of body 22. In FIGS. 1-5, for example, device 10 is illustrated as a smartphone configured to transmit or receive a signal through an exemplary antenna 14. A secondary opening 25A preferably extends through body 22 to permit passage of the signal to or from antenna 14 when housing 12 of device 10 is secured in body 22. For example, in FIG. 2, a secondary opening 25A is placed directly over antenna 14, thereby allowing a signal to pass through body 22. Any secondary opening 25A may be formed by extruding, machining, or other process. A variety of secondary openings 25 may be placed on body 22 to accommodate the features of a particular device 10, or to receive a fixation device for securing device 10 in holder 20, as noted below.

A component bay 40 may be formed in or on body 22, preferably within interior space 30. For example, body 22 may be extruded to form bay 40 as a channel or groove in back portion 28 that extends at least partially therethrough along body axis B-B. Alternatively, bay 40 may be machined out of back portion 28 to assume any shape.

Component bay 40 of FIG. 2 is illustrated as a depression formed on the front surface 27 of back portion 28. Bay 40 of FIG. 2 is adapted to receive a secondary component 42. Positioning bay 40 on front surface 27 allows a portion of secondary component 42 to be adjacent or physically connected to a portion of device 10. Because of this proximity, component 42 may be secured in component bay 40 by a back surface of device 10 after device 10 has been secured in holder 20. Component 42 may be permanently or removably secured in component bay 40 by a fixation device, adhesive, or like mechanism. For example, component 42 may have a protrusion that slides or snaps into a corresponding ridge formed into body 22. In which case, the back surface of device 10 may be used to redundantly secure component 42 in component bay 40.

Secondary component 42, shown for example in FIG. 2, is adapted to interact with electronic device 10, at least when housing 12 of device 10 is received in holder 20. Component 42 of FIG. 2 is illustrated as having a sensor 44 and a transmitter 46. Sensor 44 may be any sensing device; preferably, sensor 44 is a specialized sensor that is not typically included in a smartphone. Transmitter 46 is preferably a generic transmitter device that is adapted to work with any embodiment of device 10. In some embodiments, sensor 44 is a specialized medical sensor adapted to diagnose a particular condition, while transmitter 46 is a Bluetooth® transmitter adapted to communicate with one or more smartphone devices.

A secondary opening 25B is illustrated in FIG. 2 as extending though back portion 28 to be in communication with component bay 40. As shown, opening 25B is adapted to receive a portion of sensor 44 therethrough, such as a lens. Accordingly, any otherwise generic device 10 may be converted into a specialized medical sensing device, and thus enhanced, when its exterior housing 12 is secured in holder 20 and transmitter 46 is physically connected to, or wirelessly paired with, device 10. Component 42 is preferably an interchangeable element, thereby allowing the same device 10 to be converted into a plurality of specialized devices simply by swapping out one embodiment of secondary component 42 for another.

A securement element 60 may be comprised of one or more portions of body 22. In FIGS. 1-2, for example, sidewalls 24 and 26 and their respective edge portions 39 are configured to secure device 10 in holder 20 when device 10 is slid into interior space 30 along body axis B-B. As noted above, holding space 30W has been sized to conform to the width of device 10. Preferably, width 30W is approximately equal or slightly less than the width of device 10 so that sidewalls 24 and 26 are adapted to impose a biasing force upon housing 12 of device 10 as it is slid into space 30 along axis B-B. Each edge portion 39 of sidewalls 24 and 26 of FIG. 2 is similarly sized. For example, each sidewall 24, 26 is illustrated as having a height along body height axis C-C that is approximately equal or slightly greater than the corresponding height of device 10. Thus, edge portions 39 may be likewise adapted to impose a biasing force upon housing 12.

The biasing forces imposed on housing 12 of device 10 by sidewalls 24, 26 and their respective edge portions 39 may be sufficient to secure device 10 in holding space 30. To reinforce this first securement means, securing element 60 of FIG. 2 may have a second securement means comprising of at least one layer or strip of resilient material 62. In some embodiments, material 62 may be embodied as a flocking material or resilient foam, although any like material may be used. As shown, an exemplary strip of resilient material 62 is attached to the respective interior surfaces of sidewalls 24 and 26. Material 62 is preferably compressible in a first direction along axis A-A, away from body axis B-B. Because material 62 is resilient, each layer of material 62 will expand along axis A-A in a second direction opposite of the first direction as device 10 is received in holding space 30 along axis B-B. Resilient material 62, as it expands, preferably conforms around the exterior edges of device 10. For example, as in FIG. 2, material 62 is secured to the interior surfaces of sidewalls 24, 26 and adapted to surround the exterior edges of device 10. This configuration ensures that any regular or irregular shaped portion of any embodiment of device 10 may be secured within holder 20.

Numerous alternative embodiments of the present invention are also described in this application with reference to either holder 20 or another, alternative holder 120, 220, or 320. Like reference numbers have been utilized to describe each element of these alternative embodiments wherever possible. Although certain elements have been described with reference to a particular embodiment of holder 20, the present invention may include any possible combination of any element of holder 20, 120, 220, or 320 that is described in this application.

Body 22 may be modified. For example, body 22 has been described as an extruded metallic element. The use of metal is preferred, but not required. For example, some embodiments of body 22 may be formed entirely of a non-metallic base material, such as plastic. Although described as extruded, some embodiments of body 22 may be formed by an alternative means, such as casting, molding, or like technique. Body 22 of FIG. 1 is depicted as stand-alone element with a component bay 40. Although preferred, component bay 40 and secondary component 42 are not essential elements of the present invention. In still other embodiments, body 22 may be formed integrally within another extruded element. For example, the securing elements of body 22 may be formed integrally an extruded element of a medical cart, such as a support leg, thereby allowing device 10 to be secured directly to the cart by any embodiment of securement element 60 described herein. Sidewalls 24 and 26, as well as back portion 28, are depicted in FIG. 1 as being integral elements of holder 20, yet these elements may also be extruded or otherwise formed separately and then assembled to form holder 20.

Figure 3A:
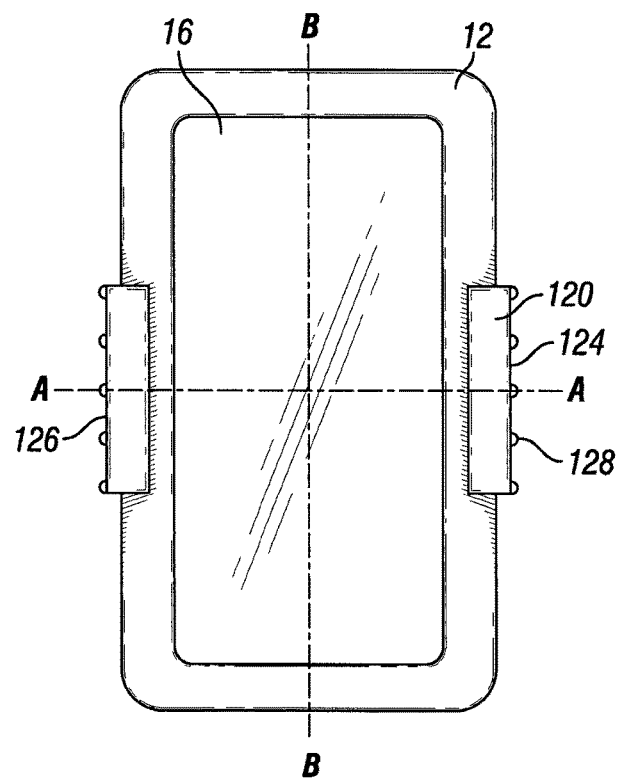
FIG. 3A is a front view of an electronic device holder according to another embodiment of the present disclosure in conjunction with the electronic device.
Figure 3B:
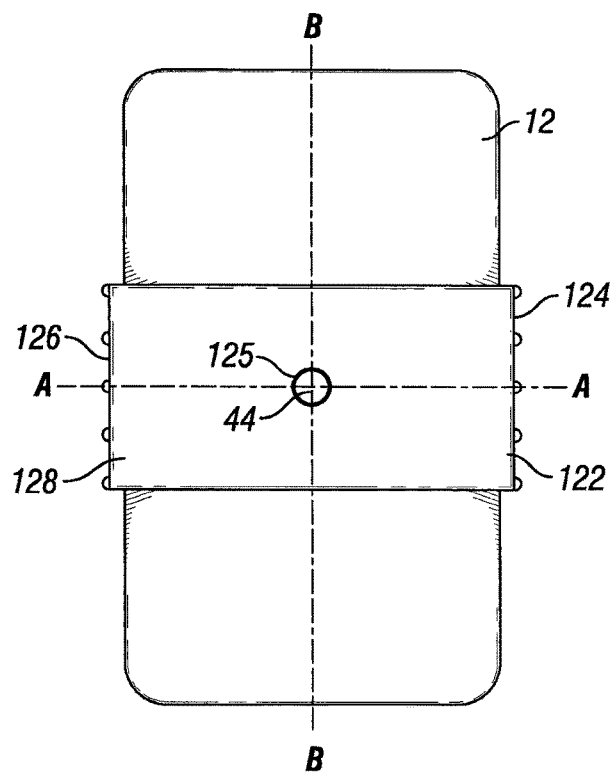
FIG. 3B is a rear view of the electronic device holder and electronic device of FIG. 3A.

As a further example, an alternative body 122 is depicted in FIGS. 3A-B. Body 122 has a substantially uniform cross-sectional shape 121, much like cross-sectional shape 21. Body 122, however, has a length along body axis B-B that is substantially shorter than a corresponding length of device 10. As shown, the length of body 122 is approximately 20 to 30 percent of the length of device 10. Any embodiment of securement element 60 may be utilized to secure a portion of device 10 in body 122. For example, as above, device 10 may be secured by a set of biasing forces applied by sidewalls 124, 126 via an embodiment of resilient element 60 that is attached to the interior surfaces of body 122. If element 60 is a conformable element, as above, then this configuration desirably permits any one of the devices 10 to be interchangeably secured in a holder 20. For example, each resilient element 60 may be conformed to receive different models of the iPhone®, even if the exterior housing 12 of some models has a slightly different width or shape than others.

Back portion 28 may also be modified. For example, a back portion 128 is depicted in FIGS. 3A-B as having at least one protrusion 130 formed thereon. Protrusion 130 may be utilized to provide a gripping surface for holder 120. Alternatively, protrusion 130 may provide a mounting platform that allows holder 120 to rest on a flat surface, like a table. Alternatively still, protrusion 130 may be engageable with a mounting device, like a tripod or other mounting arm. Although not shown in FIGS. 3A-B, yet another embodiment of back portion 128 may be expandable along body width axis A-A. For example, a first part of back portion 128 may be mounted to a track formed in a second part of back portion 128, thereby allowing the two parts of portion 128 to slide relative to each other along axis A-A to receive a particular device 10. A resilient element, like a spring, may be utilized to bias the first and second parts toward one another in order to secure device 10 therebetween. In some embodiments, a locking device, such as a ratchet, may be incorporated to firmly secure device 10 by fixing the distance between the first and second parts of portion 128 in at least one direction.

Alternative embodiments of component bay 40 are also described in this application. Bay 40 has been described, for example, as a depression in the front surface 27 of back portion 28. In other embodiments, each bay 40 may be a cavity formed in back portion 28 to be in communication with a slotted opening. For example, component 42 may be a card-like element that is inserted into the cavity through the slotted opening and, thus, embedded within back portion 28 of body 22. A sealing element may be used to prevent contaminants from entering the cavity.

Body 22 is illustrated in FIG. 2 as having a single component bay 40 that is adapted to receive a single secondary component 42. In other embodiments, body 22 may be adapted to receive multiple secondary components 42. For example, body 22 may have multiple component bays 40, each being adapted to receive a component 42. Bay 40 may also be enlarged for the same purpose. Alternatively still, all or a substantial portion of back portion 28 may be removably attached to body 22. This configuration desirably allows the entirety of component bay 40 to be interchangeable. For example, secondary component may be sealed within bay 40 and, thus, interchanged simply by swapping out one back portion 28, 128, etc., for another.

Various embodiments of secondary component 42 are also contemplated. Some embodiments of component 42 expand the capabilities of device 10. Component 42 of FIGS. 2 and 3B, for example, has as specialized sensor 44 and a generic transmitter 46, as noted above. In some embodiments, sensor 44 may be embodied as an ultrasonic level or sensing system. This configuration allows device 10 to be converted into an ultrasound device when housing 12 is secured in holder 20. In complement, transmitter 46 may be any communication device that allows the resulting ultrasound image to be displayed on display 16, preferably in real-time. Any type of sensor 44 may be used, including any sensor 44 adapted to detect or measure a physical property. For example, sensor 44 might alternatively be a specialized magnetic field sensor that is calibrated to measure the amount of electricity flowing through an electronic medical device implanted inside the patient's body, such as a heart pump implanted within the patient's thorax. As before, transmitter 46 may then be used to transmit the measurements obtained by sensor 44 to device 10 for display on display 16.

Other embodiments of secondary electrical component 42 are adapted to enhance the existing capabilities of device 10. Component 42 may be a booster used to enhance any signal transmitted or received by device 10. For example, component 42 may be adapted boost signal strength so that device 10 may be used in more remote areas, or within large buildings that would otherwise block said signals. Component 42 may also be a converter that is adapted to convert the signal from one form to another. For example, component 42 may allow a CDMA compatible smartphone to be converted into a GSM compatible smartphone.

Alternative components 42 may also be utilized to provide device 10 with additional redundancy. For example, component 42 may be embodied as a back-up battery operable with device 10, or a charging element adapted to charge a battery (not shown) within device 10. As noted above, body 22 may allow a portion of device 10 to be physically connected to component 42. Thus, device 10 may be charged by component 42 when this physical connection is made. Alternatively, component 42 may be a charging element, such as an inductive coil, that is sealed within back portion 28 and adapted to charge the battery of device 10 via a wireless connection.

In still other embodiments, secondary component 42 may comprise an independent computing device that is interoperable with device 10. For example, component 42 may be an external controller configured to operate an implanted medical device, wherein holder 20, as described herein, forms an exterior housing of the external controller. In this regard, device 10 may be converted into a peripheral accessory of component 42 when it is secured in holder 20. For example, component 42 may be used to control the implantable device, while device 10 is used to communicate the performance characteristics of the implantable device to a third party or external system.

Various embodiments of securement element 60 are also disclosed. A portion of element 60 is described above as a strip of resilient material 62 that is attached to each of sidewalls 24 and 26. Each layer 62 has a contact surface 63 that faces interior portion 30 of holder 10. Each contact surface 63 is depicted in FIG. 2 as being substantially parallel to sidewalls 24, 26, resulting in a holding space width 30W that is substantially uniform along body axis B-B. Width 30W may also be varied along axis B-B. For example, layer 62 may be sloped along axis B-B from one end of body 22 to the other so that device 10 may be wedged between each strip 62 when slid into holder 20 along axis B-B. This configuration desirably increases the biasing forces utilized to hold device 10 in holder 20.

Figures 4, 5:
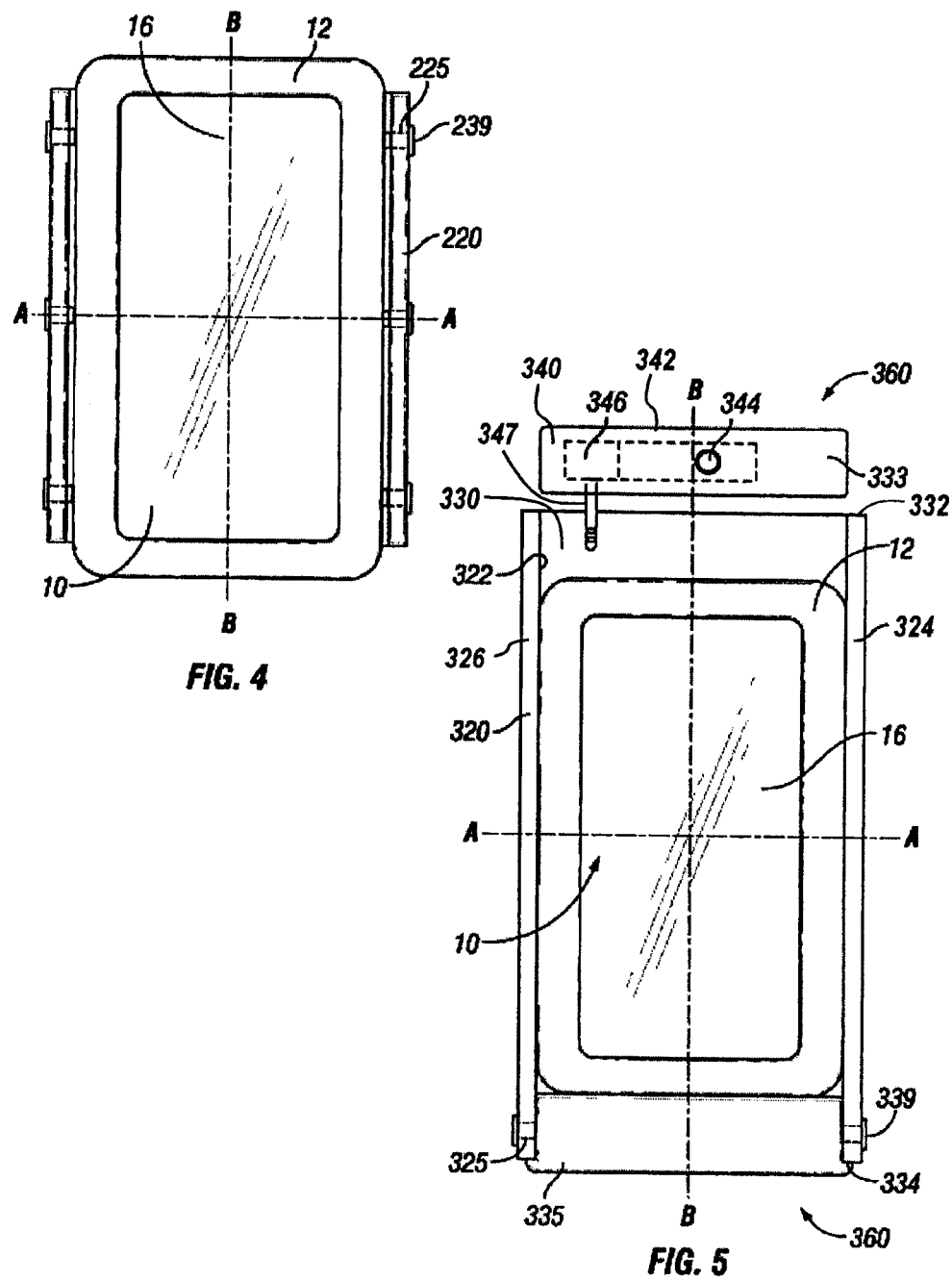
FIG. 4 is a front view of an electronic device holder according to a further embodiment of the present disclosure in conjunction with the electronic device.
FIG. 5 is a front view of an electronic device holder according to yet another embodiment of the present disclosure in conjunction with the electronic device.

Another alternate embodiment of securement element 60 is illustrated in FIG. 4 with reference to a holder 220. A body 222 of holder 220 is depicted in FIG. 4 as having at substantially uniform cross-sectional area 221 that defines a first open end 232 opposite of a second open end 234. In this alternate embodiment, a portion of a securement element 260 may, for example, comprise of a layer of resilient material 262 that is attached to all of the interior surfaces of body 222.

Body 222 of FIG. 4 also has a plurality of secondary holes 225. At least some of these secondary holes 225 are adapted to receive a fixation element 239 for securing housing 12 in body 222. For example, fixation element 239 may be a threaded screw that is engageable with a threaded portion of a secondary hole 225. This configuration allows device 10 to be secured in body 222 by the biasing forces imposed upon exterior housing 12 of device 10 by each element 239 as it is screwed into one of the holes 225. As a further example, fixation element 239 might alternatively be embodied as a plug that is inserted into a secondary hole 225, after device 10 has been received in holding space 30, so as to impose a like biasing force upon housing 12. In still other embodiments, fixation element 239 may be comprised of a resilient material that deforms to receive device 10 along axis B-B, and then expands to secure device 10 in space 30.

Yet another embodiment of securement element 60 is depicted in FIG. 5 with reference to a holder 320 having a securement element 360. As shown, element 360 further comprises at least one endcap adapted to secure housing 12 of device 10 in body 322. For example, element 360 of FIG. 5 has a first endcap 333 opposite of a second endcap 335, each endcap 333, 335 being mounted to the respective first and second open ends 332, 334. This configuration allows device 10 to be secured in body 322 by sliding housing 12 into an interior space 330 of body 322 along axis B-B and then mounting each endcap 333, 335 onto its respective open end 332, 334. Endcaps 333, 335 may be sized to obtain a frictional fit in open ends 332, 334. Alternatively, as in FIG. 5, each sidewall 324 and 326 adjacent open end 334, for example, has a secondary hole 325 extending through body 322. Each hole 325 is sized to receive a fixation element 339 that is adapted to secure housing 12 of device 10, as described above.

End caps 333, 335 may also be used to enhance the capabilities of device 10. For example, in FIG. 5, an electrical component 342 is interchangeably mounted within a component bay 340 formed inside of endcap 333. Similar to above, component 342 is configured to have a sensor 344 and a transmitting element 346. In FIG. 5, transmitting element 346 is embodied as a shaft 347 adapted to form a hard connection with device 10 when inserted into a corresponding port of device 10 (not shown). Alternatively, sensor 344 may be mounted in endcap 333, while transmitter 346 is mounted in endcap 335, thus allowing the capabilities of device 10 to be interchangeably configured by swapping one embodiment of endcap 333 or 335 for another.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A holder for a housing of an electronic device, comprising
   an extruded metal portion configured to receive the housing, the extruded metal portion including:
   a back portion having a front surface and a back surface opposite the front surface, the back portion defining a component bay having a medical sensor disposed therein and defining an opening in communication with the component bay, the opening extending from the front surface through the back surface and having the medical sensor extending at least partially therethrough; and
   a securement element that is at least one from the group consisting of mounted to the extruded metal portion and integral with the extruded metal portion, the securement element being configured to secure the housing in the extruded metal portion.

2. The holder of claim 1, wherein the extruded metal portion is made of aluminum.

3. The holder of claim 1, wherein the extruded metal portion is anodized.

4. The holder of claim 1, wherein the extruded metal portion defines an interior space configured receive the housing.

5. The holder of claim 4, wherein the extruded metal portion comprises a first sidewall, a second sidewall, and the back portion, each of the first and second sidewalls projecting in a forward direction from the back portion so as to define the interior space.

6. The holder of claim 5, wherein each sidewall has an edge portion projecting toward the opposite sidewall, each edge portion being remote from the back portion, and wherein the securement element includes each edge element.

7. The holder of claim 4, wherein the securement element includes a resilient material on an interior surface of the extruded metal portion that is configured to be compressed when the housing is received in the interior portion, the resilient material being configured to exert a biasing force that secures the housing in the extruded metal portion.

8. The holder of claim 7, wherein the resilient material is a flocked fabric.

9. The holder of claim 7, wherein an exterior surface of the resilient material is frictionally engageable with an exterior surface of the housing.

10. The holder of claim 1, wherein the electronic device is configured to transmit and receive a signal, the extruded metal portion having at least one opening adapted to permit passage of the signal when the housing is secured in the extruded metal portion.

11. The holder of claim 10, wherein the housing is a cellular telephone and the signal is a cellular telephone signal.

12. The holder of claim 1, further comprising an electrical component attached to the extruded metal portion, the electrical component being adapted to interact with the electronic device when the housing of the electronic device is received in the holder.

13. The holder of claim 12, wherein the electrical component is a power source.

14. The holder of claim 13, wherein the electrical component is adapted to at least one of transmit and receive a signal.

15. The holder of claim 14, further comprising an electrical component mounted to the endcap, the electrical component being adapted to interact with the electronic device when the housing of the electronic device is received in the holder.

16. The holder of claim 1, wherein the extruded metal portion has an open end and the securement element comprises an endcap mounted to the open end.

17. The holder of claim 16, wherein the electrical component is a power source.

18. The holder of claim 17, wherein the electrical component adapted at least one of transmit and receive a signal.

19. The holder of claim 1, wherein the extruded metal portion defines at least one hole extending therethrough and the securement element comprises a fixation article configured to be inserted into each hole to secure the housing in the extruded metal portion.

20. The holder of claim 19, wherein the fixation article is at least one from the group consisting of a plug and screw.

* * * * *